Aug. 5, 1952  F. W. BROOKE  2,606,015
OPEN-HEARTH FURNACE
Filed Jan. 31, 1950  10 Sheets-Sheet 2
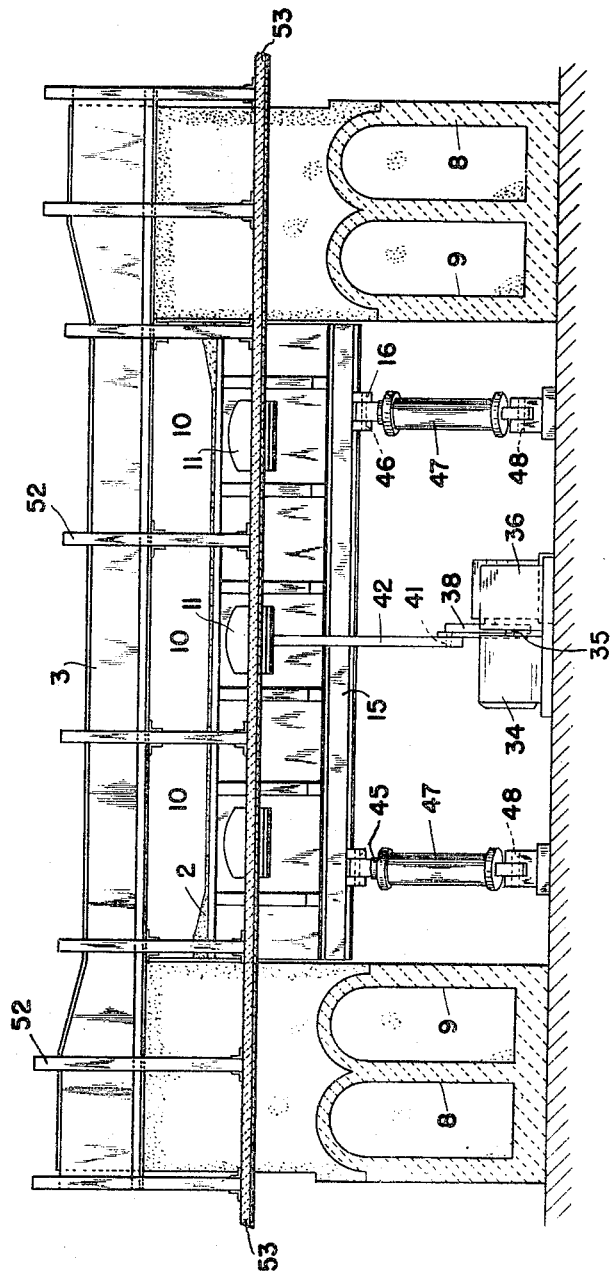
INVENTOR.
Frank W. Brooke
BY
HIS ATTORNEYS Aug. 5, 1952 F. W. BROOKE 2,606,015
OPEN-HEARTH FURNACE
Filed Jan. 31, 1950 10 Sheets-Sheet 3
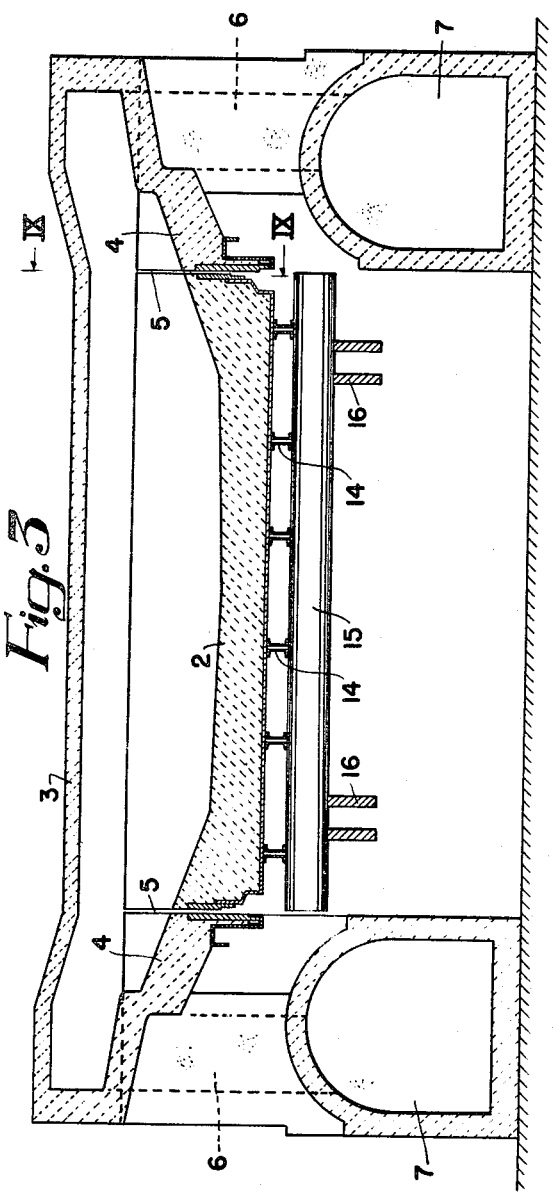
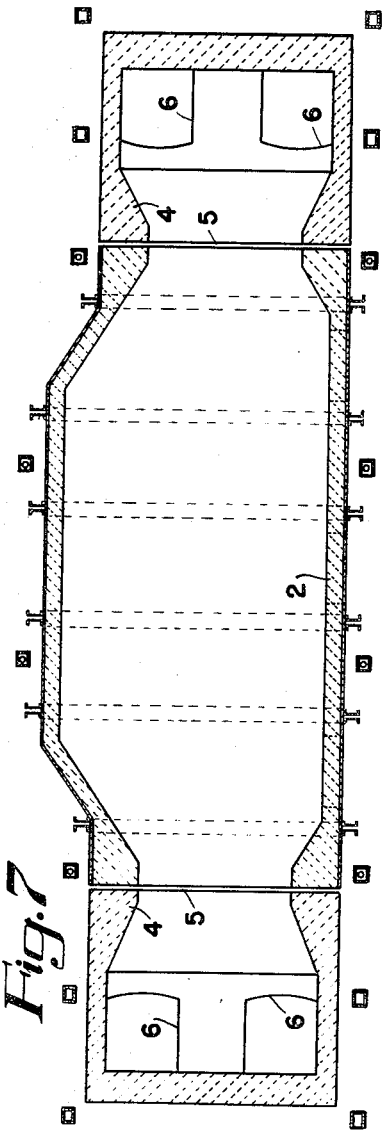
INVENTOR.
Frank W. Brooke
BY
HIS ATTORNEYS Aug. 5, 1952  F. W. BROOKE  2,606,015
OPEN-HEARTH FURNACE
Filed Jan. 31, 1950  10 Sheets-Sheet 4

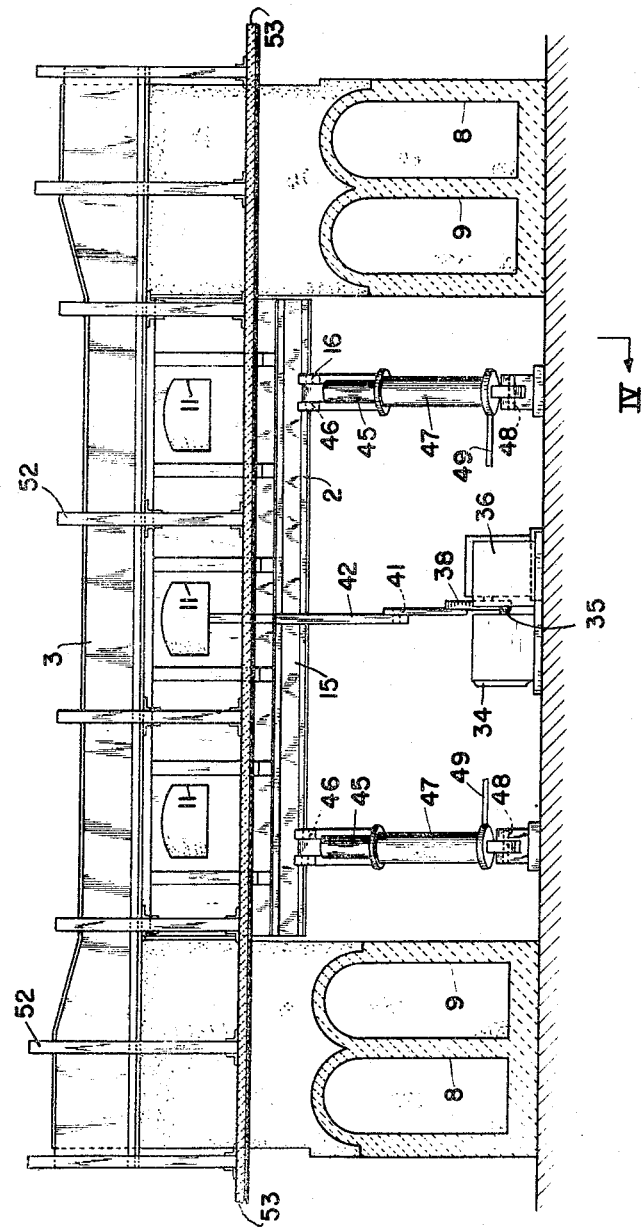

INVENTOR.
Frank W. Brooke
BY
HIS ATTORNEYS

Aug. 5, 1952 — F. W. BROOKE — 2,606,015
OPEN-HEARTH FURNACE
Filed Jan. 31, 1950 — 10 Sheets-Sheet 5
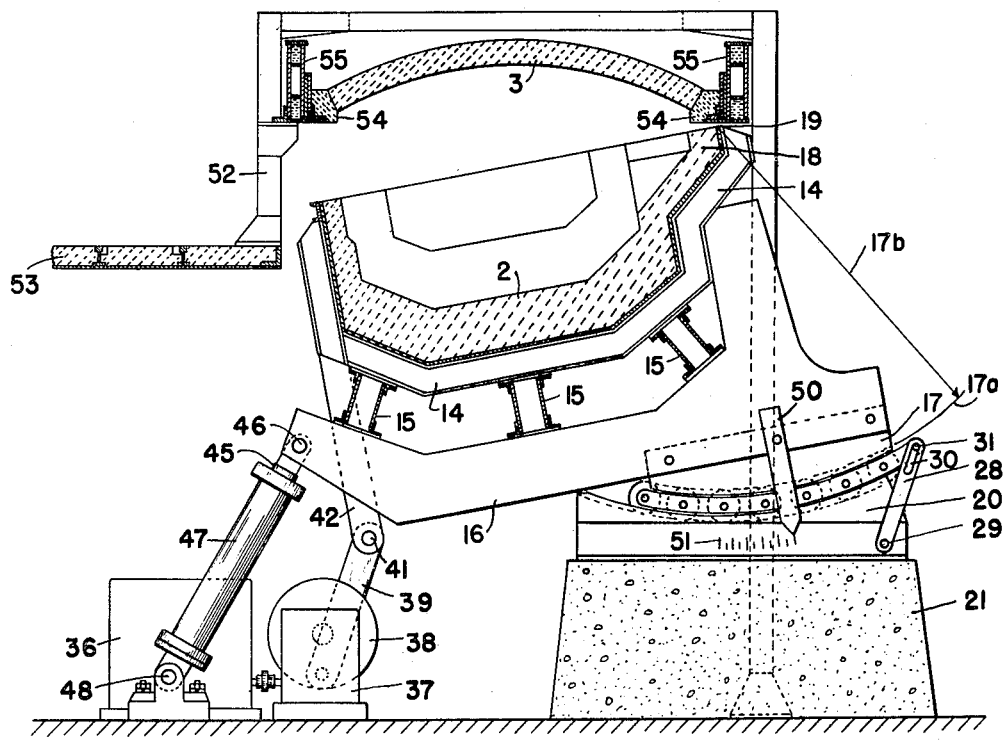
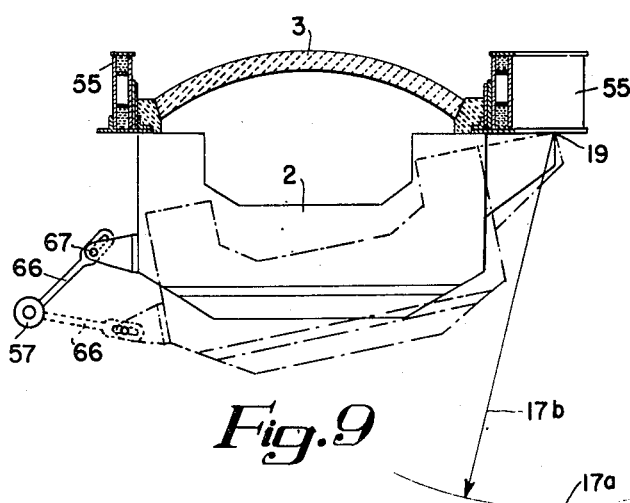
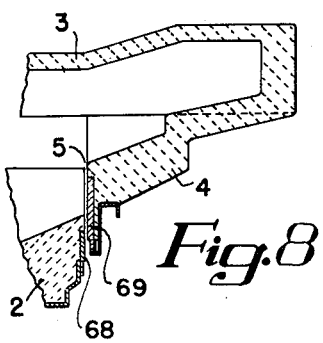
INVENTOR.
Frank W. Brooke
BY
HIS ATTORNEYS

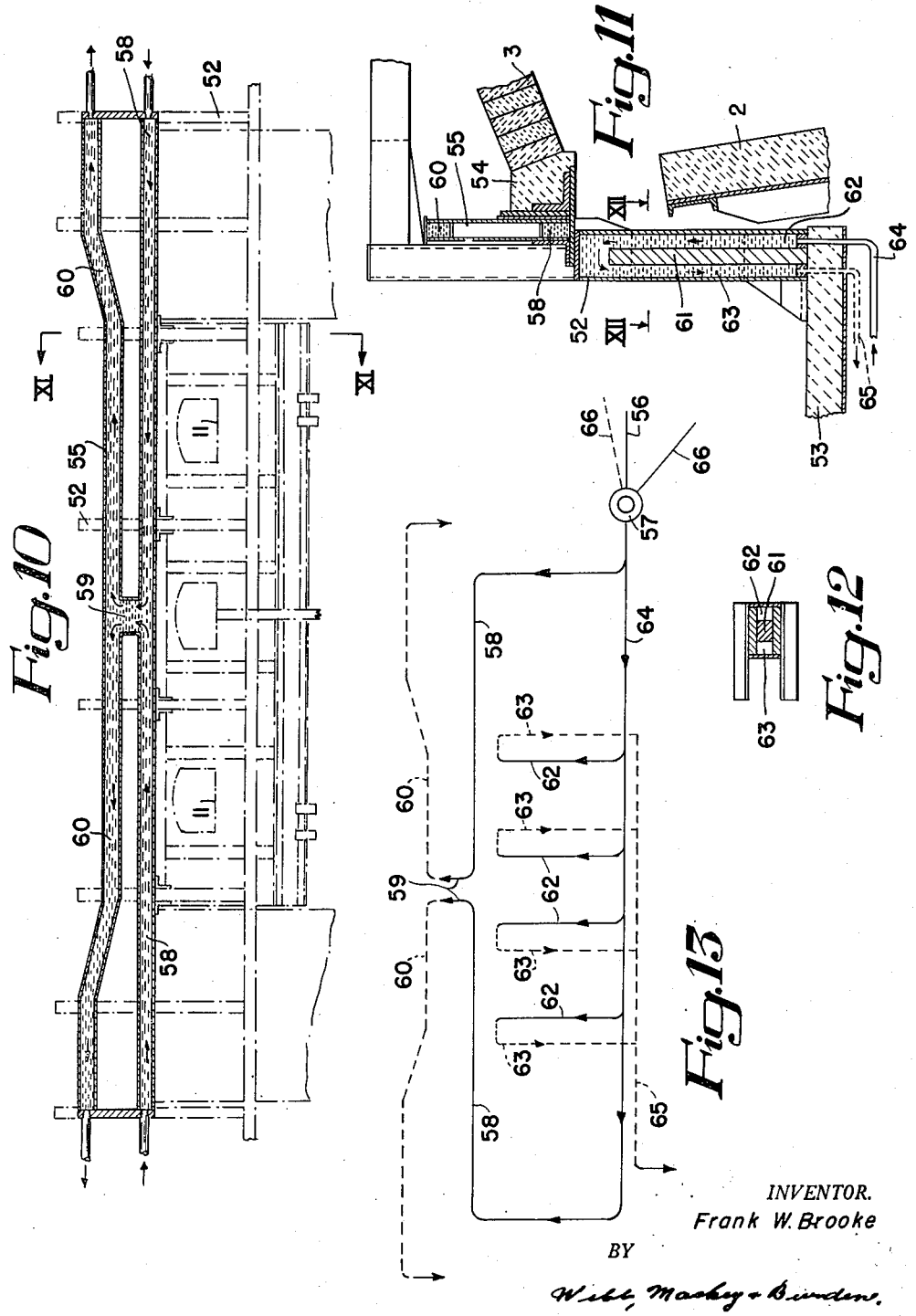

Aug. 5, 1952     F. W. BROOKE     2,606,015
OPEN-HEARTH FURNACE

Filed Jan. 31, 1950     10 Sheets-Sheet 7

INVENTOR.
Frank W. Brooke
BY
HIS ATTORNEYS

Aug. 5, 1952 — F. W. BROOKE — 2,606,015
OPEN-HEARTH FURNACE
Filed Jan. 31, 1950 — 10 Sheets-Sheet 8
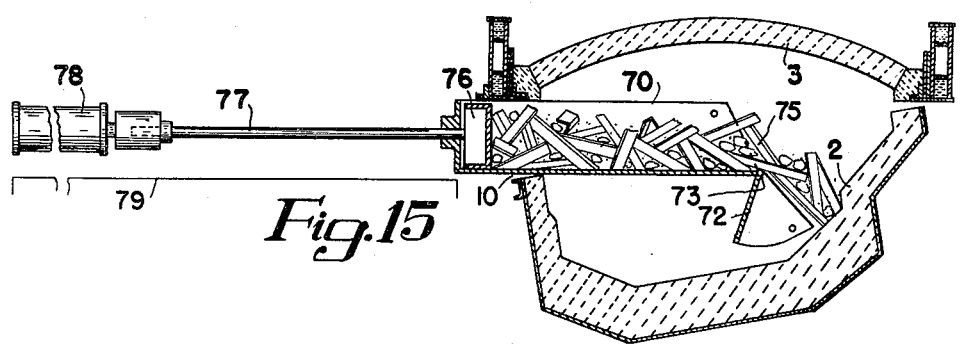
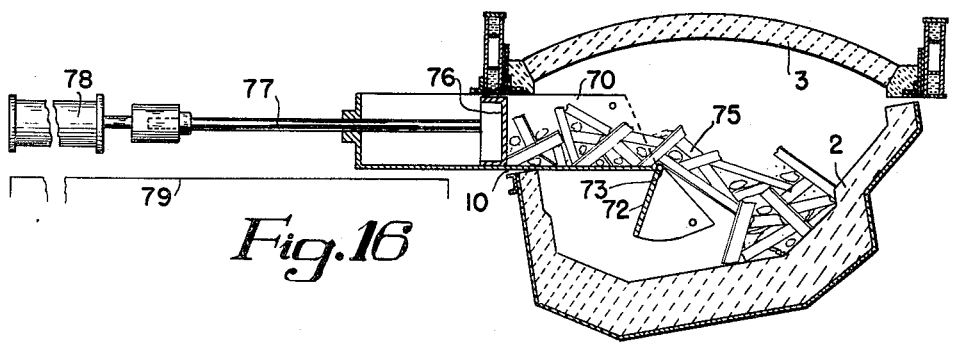
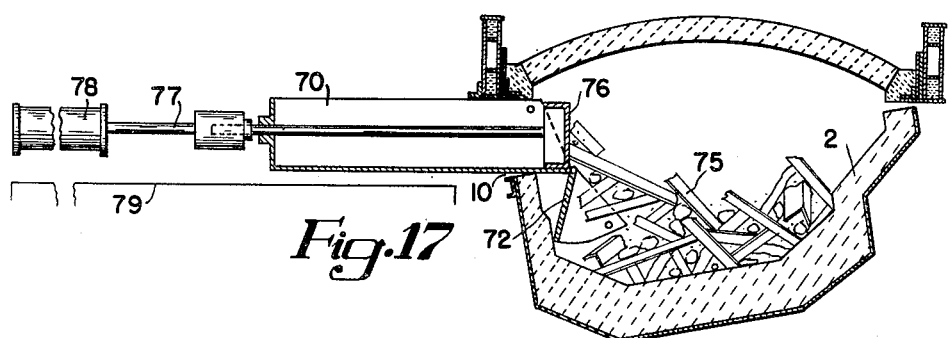
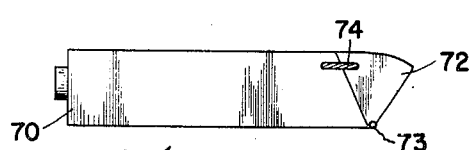
INVENTOR.
Frank W. Brooke
BY
HIS ATTORNEYS INVENTOR.
Frank W. Brooke
BY
HIS ATTORNEYS Aug. 5, 1952     F. W. BROOKE     2,606,015
OPEN-HEARTH FURNACE Filed Jan. 31, 1950     10 Sheets-Sheet 10

INVENTOR.
Frank W. Brooke
BY
HIS ATTORNEYS

Patented Aug. 5, 1952

2,606,015

UNITED STATES PATENT OFFICE 2,606,015

OPEN-HEARTH FURNACE

Frank W. Brooke, Pittsburgh, Pa.

Application January 31, 1950, Serial No. 141,554

7 Claims. (Cl. 263—40)

This invention relates to open hearth furnaces of improved construction. Briefly described, the furnace of my invention comprises a stationary roof and a tilting hearth whereby when the hearth is tilted downwardly about a horizontal axis located at approximately the line of junction between one of the furnace side walls and the roof, a space is provided between the roof and the top edge of the opposite side wall through which the furnace can be rapidly charged. According to my invention, the stationary roof extends substantially throughout the length of the furnace but the tilting hearth occupies only that portion of the furnace which lies between the bulkheads, the bulkheads being stationary.

In the accompanying drawings which illustrate a preferred embodiment of my invention:

Figure 1 is a front elevation of an open hearth furnace, the tiltable hearth being in its normal upper position used when melting and refining the charge;

Figure 2 is a front elevation of the furnace, showing the tilting hearth in its lower open position providing a space between the upper edge of the front side wall and the roof, through which space the hearth can be charged or mechanism can be introduced in order to repair the roof;

Figure 3 is a vertical longitudinal section through the furnace;

Figure 6 is a view similar to Figure 4 but showing the tilting hearth in its lower or open position;

Figure 7 is a horizontal longitudinal section through the furnace;

Figure 8 is a vertical longitudinal section through one end of the tiltable hearth, the end bulkheads and the fixed roof, the hearth being in its lower position;

Figure 9 is a vertical transverse section taken on the line IX—IX of Figure 3 showing the tilting hearth in its upper position in full lines and in its lower position in chain lines;

Figure 10 is a front elevation of the furnace illustrating the water cooled roof beams or channels and roof supporting columns;

Figure 11 is a partial vertical transverse section taken on the line XI—XI of Figure 10 showing water cooled supporting columns;

Figure 12 is a section taken on the line XII—XII of Figure 11;

Figure 13 is a schematic illustration of the manner of automatically supplying and controlling the flow of cooling water to the roof beams and roof supporting columns;

Figures 15, 16 and 17 are, respectively, vertical sections taken on the lines XV—XV, XVI—XVI and XVII—XVII of Figure 14;

Figure 17a is a side elevation of a charging box;

Figure 4:
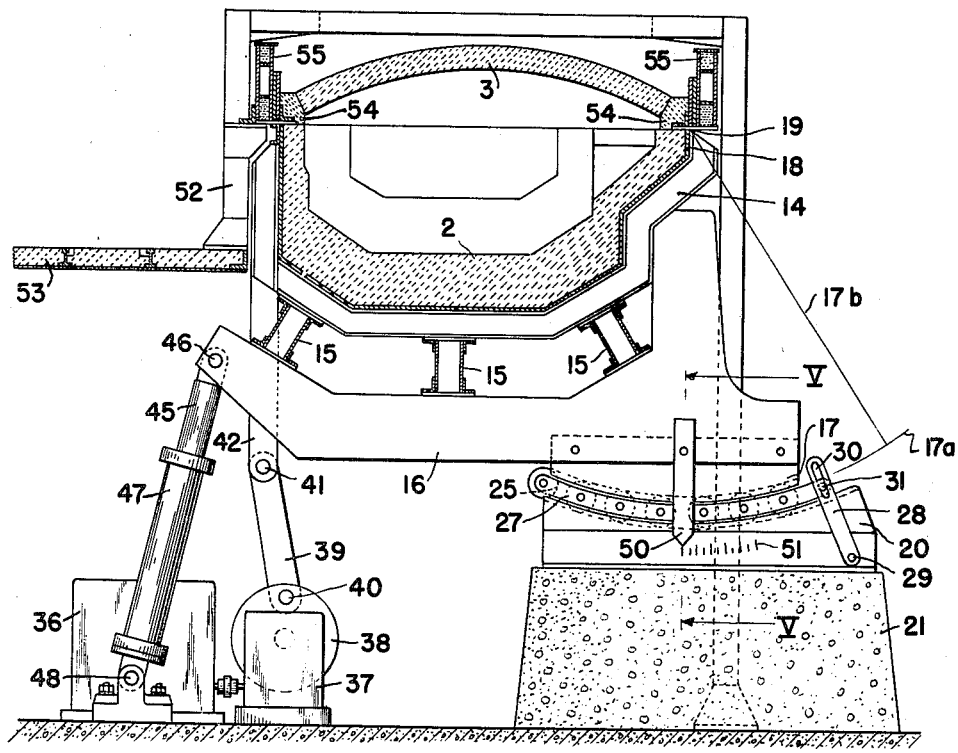
Figure 4 is a vertical transverse section, on an enlarged scale, through the furnace taken on the line IV—IV of Figure 1 and illustrating the means for mounting and operating the tilting hearth.
Figure 5:
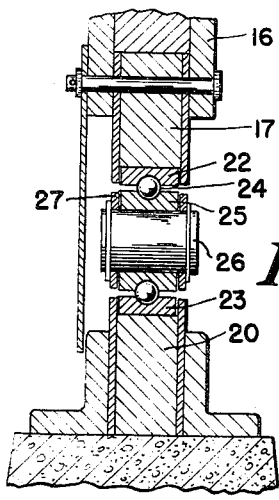
Figure 5 is a vertical section, on an enlarged scale, taken on the line V—V of Figure 4 and illustrating one of the rockable mountings for the tilting hearth.

In the melting and refining processes of steel making in an open hearth furnace where the whole or a considerable portion of the charge is cold scrap, the scrap is charged into the furnace through doors located in the front side wall of the furnace, usually by charging machines and boxes well known in the art. The number and size of these doors is limited by shell and side wall construction, which limits the size of the scrap and size of charging boxes which can be used. This method of charging takes up a considerable portion of the total time of the whole process of steel making and thereby cuts down the tonnage produced by any unit. It also causes a considerable loss of heat from the furnace hearth, side walls and roof. These losses of time and heat are two of the principal causes which today add to the overall cost of steel making in an open hearth furnace. A similar loss of time and heat occurs when a roof has to be either repaired or replaced and this adds a further item to the cost of open hearth steel making.

In normal open hearth practice the length of time which elapses from the start of one heat to the start of the next heat varies considerably but a typical period for say a 200 ton open hearth operating in a modern shop equipped with the latest mechanical devices to cut down the time required would be 12 to 13 hours when the charge consists of 40% cold scrap and 60% hot metal, and 14 to 15 hours when the charge consists of 60% cold scrap and 40% hot metal. The time required for the charging of the cold scrap is 3 to 4 hours in the first case and 5 to 6 hours in the latter case. Also in the first case 65 to 75 charging boxes would be required per heat to charge the cold scrap into the furnace, and 95 to 115 boxes would be required in the second case. In smaller furnaces of say 100 ton capacity with modern facilities where no hot metal is available and the charge consists of 100% cold scrap, the charging time averages 5 to 6 hours and the smaller furnaces having smaller doors must use smaller charging boxes and generally use from 120 to 140 boxes per heat and require a period of 13 to 14 hours from tap to tap.

The art now recognizes that over the years charging has become more and more of a bottleneck in the open hearth process and offers a fertile field for speeding up production.

From the above it can readily be seen that considerable periods of time are used up in charging the furnace and in repairing the roof and that if it were possible to cut down these times a considerable saving in the cost of operating an open hearth furnace could be made. While many attempts have been made to cut down the loss of time and heat due to these causes in the operation of an open hearth furnace, no commercial success, to my knowledge, has been accomplished.

In accordance with my invention, the charging of the cold scrap in either of the size furnaces above referred to can be accomplished in 15, 30 or 45 minutes using only 6, 12 or 18 charging boxes depending upon whether the charge is put in all at one time or is divided into two or three portions to suit the type of scrap or melting procedure.

In attempting to provide an open hearth construction which could be rapidly charged, I first considered making the roof detachable from the rest of the furnace and providing means for lifting the roof. Such solution is not feasible because of the dimensional and weight problems involved. A modern large open hearth roof has for instance a length of 87 feet, a width of 25 feet, and weighs more than 200 tons. The engineering difficulty of lifting such an open hearth roof without serious damage to its structure and to the more or less fragile nature of its brickwork is too great to present a satisfactory solution to the problem. Even if the roof could be lifted, the location of the furnace units relative to one another is such as to preclude finding a satisfactory place for supporting the roof. It would be difficult to provide anything like a 200-ton overhead crane to raise such a furnace roof even in a new plant layout and it would be entirely impractical in any existing plant layout. There is the further problem of what to do with the roof when lifted if bottom drop bucket charging of the furnace is contemplated. Another difficulty is the designing of any charging device which would distribute scrap and other items of the charge uniformly over a rectangular hearth having a length which is much greater than its width if the charge is introduced through the top of the furnace after the roof has been raised.

Having arrived at the conclusion that it was not feasible to raise the roof (the most vulnerable and expendable portion) of an open hearth furnace, my problem was to design a furnace in which the roof could remain at all times in its one proper fixed position and still provide some opening in the furnace through which the whole or the major portion of the scrap could be charged in a rapid and efficient manner.

I next considered lowering the furnace body itself to set up openings along and beneath the stationary roof. This resulted in dimensional and other problems which were difficult to solve. It also created openings which in a large furnace would be of the order of 87 feet by say 5 feet at the front and back of the furnace and 25 feet by 5 feet at each end of the furnace, which would total 1120 square feet of opening through which a very large portion of the sensible heat in the furnace hearth, side walls and roof would escape during charging. All of this heat would have to be replaced at a great expenditure of time and fuel. There was the further problem of distributing the charge uniformly along hearths having dimensions up to 50 feet by 12 feet or 600 square feet of area at a reasonably uniform depth and in a rapid manner.

I overcame these problems by lowering only the hearth portion of the furnace and by tiltably mounting the hearth portion in such manner as to provide a charging opening extending along only one side wall of the furnace. This was accomplished by making the hearth portion tiltable about a substantially horizontal axis located at approximately the line of junction between a furnace side wall and the roof. This eliminated practically all of the opening between one side wall and the roof and the opening at each end of the furnace. The result was only a single opening along the front wall of the furnace having a dimension of 52 feet by 5 feet or an area of 260 square feet. This is nearly an 80% reduction in the area of openings which results in great saving of heat which otherwise would be lost because of the draft sweeping through such openings. My new construction also permits all the charging to be carried out very efficiently on the charging floor where it belongs and where it is now always carried out.

In the size of furnace referred to the doors in present practice are approximately 5 feet 3 inches by 4 feet and are 5 in number. They have a total opening of 105 square feet and are fully opened during the entire present charging time of 3 to 6 hours and have the thermal head and draft of the whole furnace system.

With my invention, all the doors are closed during charging and the charging opening of 260 square feet need only be opened for a period of about 15 to 45 minutes since due to the location of my charging opening and the type of charging apparatus that can be employed with such opening, the charging of the furnace can be accomplished in a very rapid manner. It will be apparent, therefore, that the sensible heat loss from the furnace side walls, hearth and roof during the charging period will be greatly reduced in my furnace as compared with those previously employed. The sensible heat thus saved is absorbed by the incoming cold charge, thereby shortening the melt-down period and thereby creating a saving of time and fuel.

A further advantage of my invention is that it requires a minimum outlay of capital to change existing installations as only a portion of the furnace is involved and practically no change is required in the building, floors, cranes, tracks, etc. which form a very large portion of the cost of an open hearth installation.

Referring more particularly to the accompanying drawings, the furnace comprises a tilting hearth 2 and a stationary roof 3. The hearth forms the central part of the furnace and is located between bulkheads 4. The joints 5 between the hearth and bulkheads are sealed as described more particularly hereinafter. The roof 3 extends over the hearth 2 and beyond the ends of the hearth and over the bulkheads, the roof being an integral unit from end to end without any joints. The furnace is provided with air and gas ports of usual construction which are not shown and with the usual uptakes 6, slag pockets 7 and air and gas flues 8 and 9. When the hearth portion is tilted to lower the front wall of the hearth, an opening 10 is provided, as shown in Figure 2, between the roof and the hearth through which the furnace can be rapidly charged and into which apparatus used in repairing the roof can be introduced as explained more in detail hereinafter. Doors 11 are provided in the front wall of the hearth portion of the furnace for working the furnace in the usual manner during the melting or refining stages of the heat, but these doors are closed during the charging of the furnace in accordance with my invention.

Referring particularly to Figures 2–6, which show the means for mounting and tilting the hearth, the hearth 2 is supported by transversely extending beams 14 which are secured to longitudinally extending beams 15 which are of substantially the same length as the hearth portion. The beams 15 are supported adjacent their ends on cradles 16. Each of these cradles at its rear end has an arcuate rocker 17 secured to it, this rocker lying directly below the line of junction between the roof 3 and the rear side wall 18 of the hearth 2 so that the hearth is tiltable about a horizontal axis designtaed by the reference numeral 19 located at approximately the line of junction between the roof and the hearth side wall of the furnace. The arc of rocker 17 is designated 17a and the radius of arc 17a is designated 17b. Located below and spaced from the arcuate rocker 17 is an arcuate rocker seat 20 which is supported on a base 21. A movable bearing is interposed between the rocker 17 and the rocker seat 20. In the illustrated embodiment of the invention the arcuate rocker 17 has a bearing portion 22 and the rocker seat 20 has a bearing portion 23 which contact ball bearings 24 mounted in cages 25. Each of these cages has a pin or shaft 26 extending axially through it, the shafts being mounted in a frame formed by two arcuate side plates 27. The frame is retained on the seat 20 by a retainer 28 pivoted at 29 to the seat and provided at its upper end with a slot 30 which receives a pin 31 carried by the side plates 27. The vertical distance between the horizontal axis 19 and the arcuate surface of the rocker 17 is substantially equal to the radius of the arcuate rocker. By observing such relationship the proper tilting action can be obtained without interference between the upper edge of the rear side wall 18 and the roof 3.

The cradles 16 and the hearth 2 supported thereby are tilted by means of a motor 34. The motor shaft 35 is connected to gears in a gear reducer 36, the gear reducer driving gears in a housing 37 which in turn operate a crank 38 which is in the form of a disc. A connecting rod 39 is pivoted at 40 to the crank 38 and at 41 to a bracket 42 secured to one of the beams 15 which support the hearth. Thus rotation of the crank 38 tilts the cradles and hearth.

In order to more accurately control the tilting of the hearth, two dash pot mechanisms are provided. Each of these comprises a piston 45 pivoted at 46 to the front end of one of the cradles 16 and a cylinder 47 in which the piston 45 reciprocates. The cylinder is pivoted at 48 and contains a liquid which flows into and out of the cylinder through a conduit 49 which leads to a reservoir not shown.

A pointer 50 is secured to one of the rockers 17 and cooperates with indicia 51 to indicate the degree to which the hearth has been tilted.

The roof 3 is supported independently of the hearth 2 by columns 52 supported by the charging floor 53. The details of supporting the roof and cooling the supporting members is shown more particularly in Figures 4 and 10–13. The roof 3 is supported at its front and rear by skew back bricks 54 which in turn are supported by roof beams or channels 55. The roof beams 55 are secured to the vertical columns 52. Cold water flows through a pipe 56 controlled by a valve 57 and enters each end of a lower passage 58 in the roof beam 55. It flows through this lower passage adjacent the bottom of the beam, which is subjected during charging to the most heat from the hearth, and then flows upwardly through a central passage 59 in the beam and then through an upper passage 60 of the beam, which is subjected to a lesser degree of heat, and discharges through each end of the upper passage 60.

Each of the roof supporting columns 52 is provided with a partition 61 which forms a passage 62 adjacent the furnace and a passage 63 on the side away from the furnace. Cold water from pipe 64 flows upwardly in passage 62, which is subjected to the greatest amount of heat during charging, and then flows downwardly through passage 63, which is subjected to a lesser amount of heat, and discharges through pipe 65.

Valve 57 controlling the flow of cold water through pipe 56 which supplies water to both the roof beams and columns is provided with a control lever 66. This control lever is pivoted to the hearth 2 at 67 so as to operate the valve upon lowering and raising the hearth. The arrangement is such that during normal operation of the furnace with the hearth raised only a small amount of water is supplied to the columns and roof beams. However, when the hearth is lowered and the columns and beams are subjected to the greatest amount of heat from the hearth and roof lining, a full supply of water is provided for cooling them until the hearth is again raised, at which time the supply of water is again cut down but not cut off entirely.

The joint between each end of the hearth 2 and the bulkheads 4 is sealed by a seal indicated generally by the reference numeral 5 and shown more particularly in Figures 3 and 8. It includes a sealing plate 68 on the hearth and a sealing plate 69 on the bulkhead 4. In Figure 3 the seal is shown with the hearth 2 in its upper position and in Figure 8 in its lower position. It will be noted that the only joints to be sealed in my furnace are between the hearth and the lower portion of the bulkheads, there being no such joint in the roof 3 as is the case in a tilting open hearth furnace in which both the roof and the hearth tilt as a unit with respect to the ends of the furnace.

Figure 14:
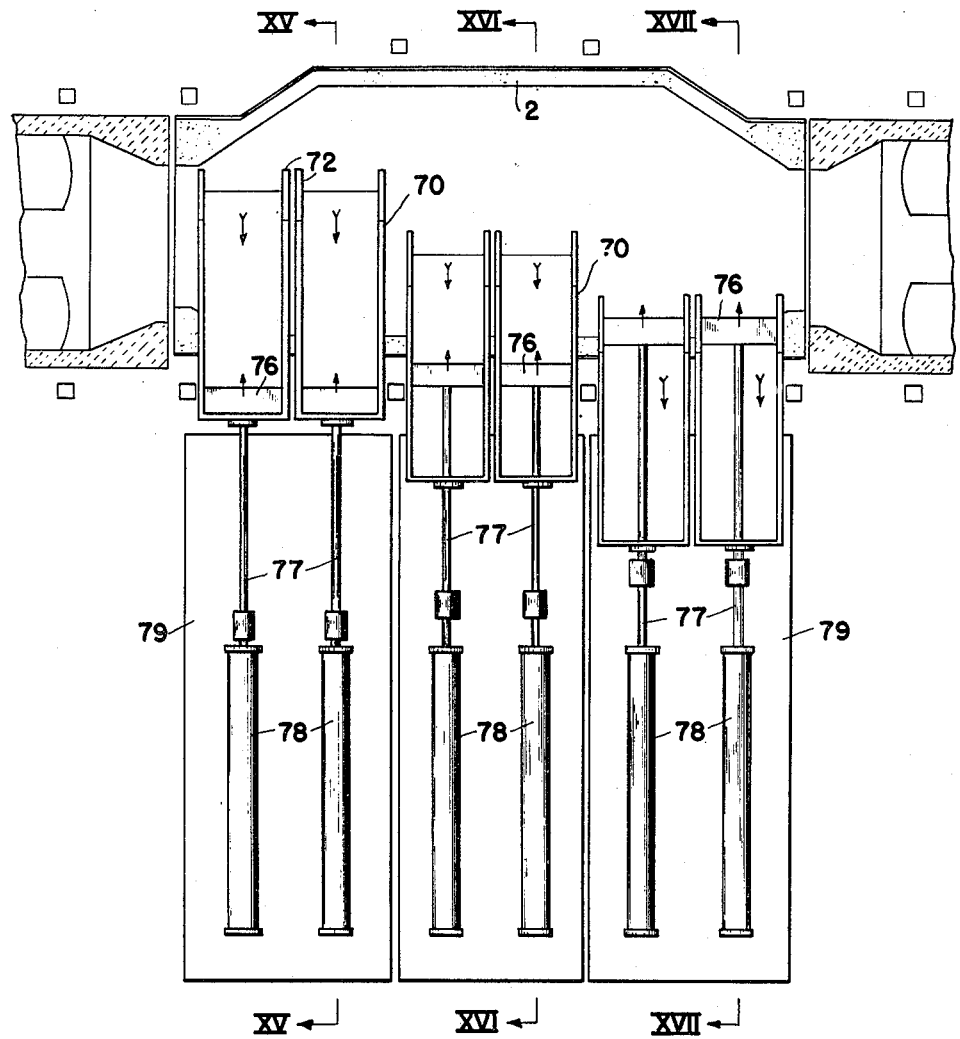
Figure 14 is a part plan view and a part horizontal section illustrating the means for rapidly charging the furnace. Three sets each consisting of two charging boxes are shown in different positions which they may assume in charging the furnace.
Figure 18:
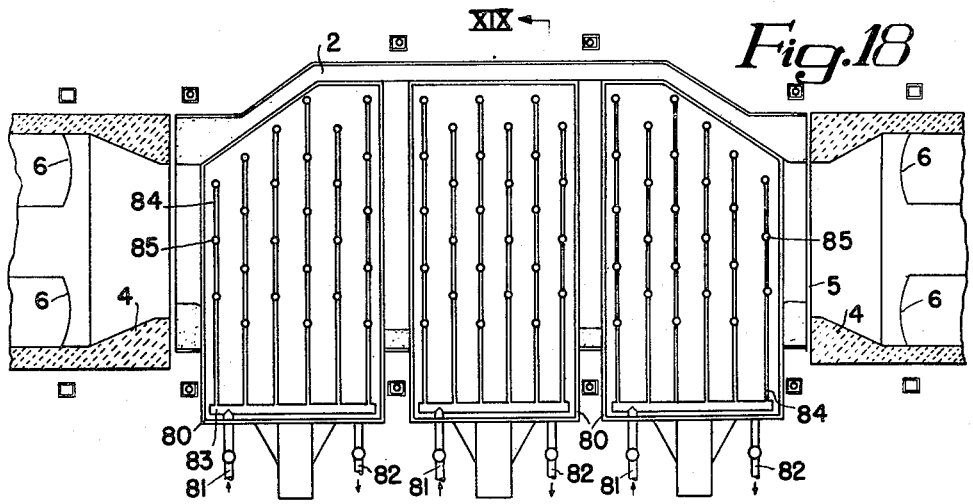
Figure 18 is a horizontal section showing the means for rapidly cooling the roof.
Figure 19:
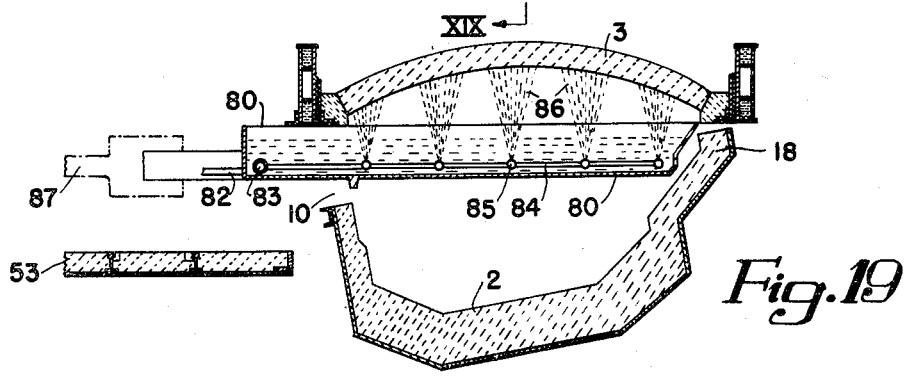
Figure 19 is a vertical transverse section taken on the line XIX—XIX of Figure 18.
Figure 20:
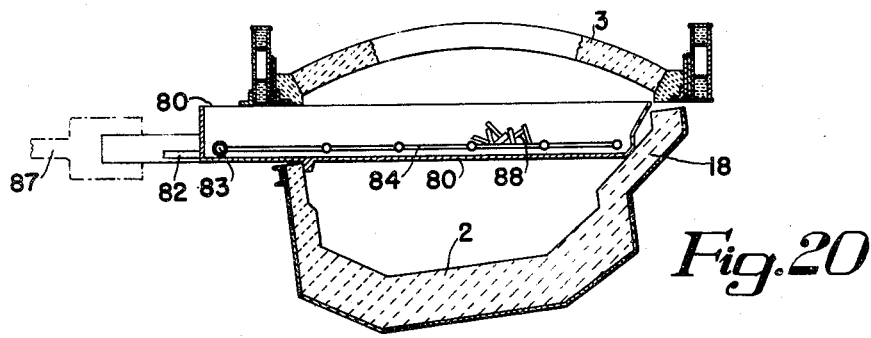
Figure 20 is a view similar to Figure 19 showing the roof partially knocked down.

My furnace, having a stationary roof and a tilting hearth, provides a space or opening 10, as shown in Figure 2, through which the furnace can be rapidly charged by the means shown in Figures 14–17. Figure 14 shows three sets of charging boxes 70, each set comprising two charging boxes, the charging boxes being shown in different positions which they may occupy in charging a furnace. Each charging box 70 is trough-shaped in cross-section and at its forward end has a chute 72 which is pivoted at 73 and is retained in its closed position by a rope or a fusible member 74 connecting the chute with the body portion of the charging box. The charge of scrap in the charging box is designated by the reference numeral 75. A pusher head 76 is arranged in the charging box and is carried by a pusher or piston 77 operated by a cylinder 78. The charging box 70 is supported by a portion of a charging machine 79 so that the charging boxes can be moved into and out of the furnace through the opening 10 between the roof, the columns and the hearth. In the operation of charging the furnace the charging boxes 70 are filled with scrap or other material to be melted, lime and ore, the chute 72 then being in its closed position, the hearth is lowered to provide the opening 10 and by means of the charging machine 79 the charging box is moved to the position shown in Figure 15. The heat of the furnace burns the rope 74 allowing the chute 72 to drop and discharging scrap adjacent the back wall of the hearth. The charging machine 79 is then moved to the left to the position shown in Figure 16 and at the same time the pusher head 76 is moved to the right by operating the piston 77 in its cylinder 78. This causes scrap to be delivered from the end of the charging box to a point adjacent the center line of the hearth. The action is continued by moving the charging box to the left to the position shown in Figure 17 and moving the pusher head 76 farther to the right, thereby discharging scrap adjacent the front wall of the furnace. In Figure 14, the movement of the charging boxes 70 in laying a charge is indicated by the tailed arrows and the movement of the pusher heads 76 by the plain arrows.

By employing the charging apparatus and method described, any type of scrap or other material can be laid uniformly over the hearth. It will be noted that the position on the hearth at which the charge is delivered is determined by the position of the end of the charging box 70, whereas the amount of charge delivered at any instant is dependent upon the relative movement between the pusher head 76 and the charging box. Since these two motions are independent of each other and can be controlled at will, the charge can be laid in any desired manner on the hearth. In order to get the best combination of quick and efficient melt-down of a charge in an open hearth furnace, it is desirable to have a certain horizontal stratification of the cold scrap portion of the charge. The stratification for a particular practice and type of scrap available may be a bottom layer of heavy scrap on the furnace bottom covered by a layer of limestone or lime, or a layer of limestone or lime covered by a layer of heavy scrap, and then over these layers a layer or layers of light scrap. This can be accomplished very quickly and very uniformly by the "laying down" method of charging, as compared with the "turning over" method of emptying present-day charging boxes according to present-day practice. Where a desired stratification of charge is desired in the furnace, I have found that the charging boxes can be filled so as to have the desired stratification and that by operating the charging devices as described the stratification in the charging boxes when outside of the furnace will repeat itself in the furnace so as to produce the desired stratification.

The operation of repairing or replacing a roof may be carried out much more rapidly and efficiently by the employment of suitable apparatus hereinafter described in connection with my stationary roof, tilting hearth furnace than with present known open hearth furnaces.

It is generally conceded that one of the most vulnerable parts of a modern open hearth furnace is the brickwork in the roof. This necessitates the periodic relining of the roof either in part or as a whole. To accomplish this the furnace has to be shut down to a general temperature which will permit workers to carry out the following operations:

1. Knock out the worn brickwork.
2. Take out this old brickwork from the still hot hearth.
3. Set up a roof form structure upon which the bricks are set. In present-day practice wooden roof forms can only be used when the temperature is low enough to prevent charring or burning and metal roof structures suffer from distortion if the temperature is too high.
4. Proceed with the laying of the bricks in an atmosphere which is very strenuous to the health and safety of the worker. This is so strenuous that workers in the case of major repairs can only work very short periods of time and relay skilled labor has at all times to be availabe so as to keep the expensive shut-down period to a minimum.

The disadvantages are overcome or materially decreased according to my invention. Reference is made particularly to Figures 18–22, which illustrate apparatus and method useful in rapidly repairing a furnace roof.

In repairing a roof according to my invention, the hearth 2 is tilted to lower it so as to provide the space 10 between the roof and the hearth at the front of the furnace. A series of water-cooled pans provided with water sprays are then inserted into the furnace so as to seal off the heat of the hearth from the roof. Each of the pans 80 has a water inlet pipe 81 and a water outlet pipe 82. The inlet pipe 81 connects with a header 83 which supplies water to a series of pipes 84 extending lengthwise of the pan. The pipes 84 are provided with openings 85 which form upwardly directed sprays 86 of water which impinge against the hot roof 3 and rapidly cool it. The water from the sprays drops back into the pan and flows out of the pipe 82. The forward end of the pan 80 rests against the rear wall 18 of the hearth, thereby preventing the heat of the hearth from heating the roof. Accordingly, the furnace need not be cooled down to the extent that it would have to be in order to enable workers to work on the roof in the absence of the water cooled pans 80. The workmen then knock down the bricks of the roof, which fall into the pan 80, and the pan with the worn bricks is removed from the furnace. Any suitable device such as a charging machine 87 may be employed to move the pans into and out of the furnace. The worn brick which have been knocked from the roof and received in the pans are designated by the reference numeral 88 in Figure 20.

Figure 21:
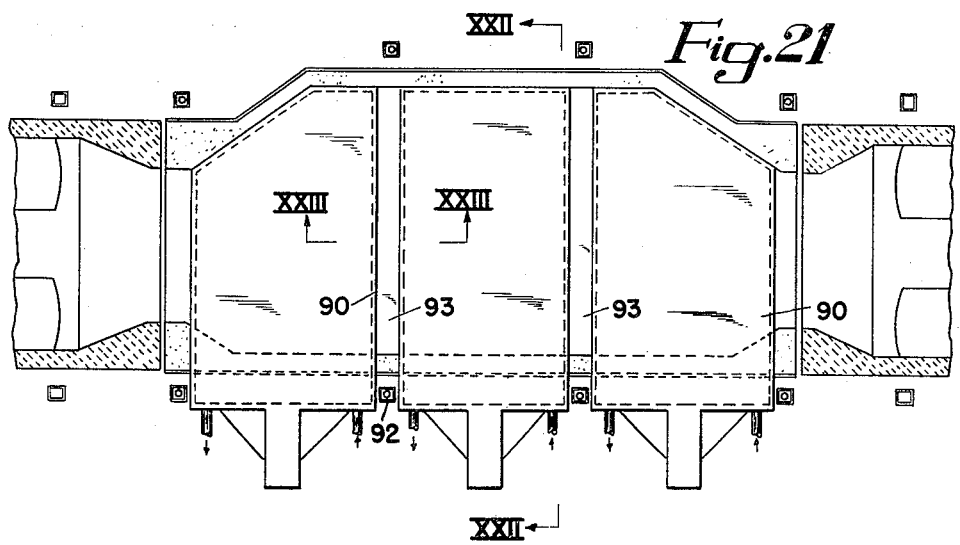
Figure 21 is a horizontal section illustrating roof supports in place in the furnace for rebuilding the roof.
Figure 22:
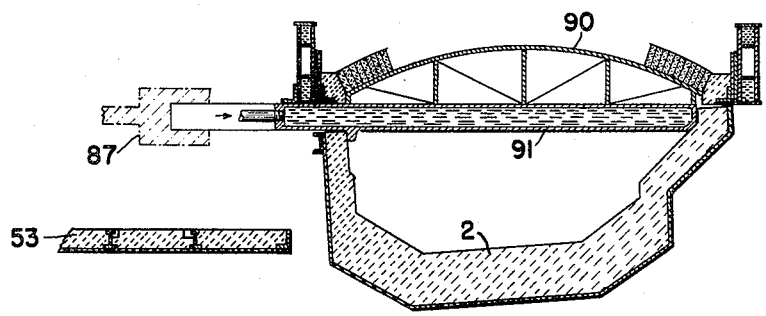
Figure 22 is a vertical transverse section taken on the line XXII—XXII of Figure 21.
Figure 23:
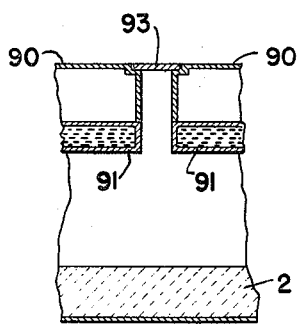
Figure 23 is a section taken on the line XXIII—XXIII of Figure 21.

Roof forms 90 mounted on a water cooled base 91 are then placed in the furnace, as shown in Figures 21 and 22, and the roof is built up on the forms. Here again the water cooled base 91 seals in the heat of the hearth so that workmen can assemble the bricks on the roof forms even though the hearth is at a relatively high temperature, thus conserving a large amount of heat in the hearth which is available for melting the next charge and resulting in very rapid repair of roofs. The parts of the roof in line with the columns 92 can be filled with small roof forms 93 to complete the roof form on which the brick are laid.

In accordance with my invention, the roof is stationary and there is no joint in the roof between the middle portion and ends of the furnace which has to be sealed. Such construction has several advantages over the ordinary tilting type open hearth furnace in which the central portion of the furnace, including both roof and hearth, tilt relative to the ends of the furnace. In such construction seals must be provided in the joints between the middle portion of the roof and the ends of the roof, as well as between the hearth proper and the bulkheads. In my furnace the joints and seals in the furnace roof are eliminated. The only seals required are between the hearth and the bulkheads. In the ordinary tilting open hearth furnace there is separation of the seals during the pouring period when the furnace contains molten steel, whereas in my furnace the only separation of the seals is during tilting of the hearth for charging, there being no separation during the pouring period when my furnace operates in the manner of a stationary furnace. In my furnace, since the roof is free from joints and seals, it acts as a hood preventing upwardly induced drafts and consequent loss of heat from being set up. The maintenance of the seals in my furnace, being less in number and simpler in construction than in the ordinary tilting open hearth furnace, is very simple.

The invention is not limited to the preferred embodiment but may be otherwise embodied or practiced within the scope of the following claims.

I claim:

1. An open hearth furnace comprising a stationary roof, a unitary structure including a hearth and side walls integral with the hearth, said side walls extending up to the roof when said unitary structure is in raised position, said roof extending beyond the ends of said unitary structure, said unitary structure being tiltable relative to the roof about a horizontal axis extending longitudinally of the furnace and located at approximately the line of junction between a side wall of said unitary structure and the roof, thereby providing a charging opening between the roof and the top of the other side wall when said unitary structure is tilted to lowered position, and means for tilting said unitary structure.

2. An open hearth furnace comprising a stationary roof, a unitary structure including a hearth and side walls integral with the hearth, said side walls extending up to the roof when said unitary structure is in raised position, said roof extending beyond the ends of said unitary structure, a bulkhead at each end of said roof and said unitary structure, the bulkheads being integral with the roof, a seal between each end of said unitary structure and one of said bulkheads, said unitary structure being tiltable relative to the roof about a horizontal axis extending longitudinally of the furnace and located at approximately the line of junction between a side wall of said unitary structure and the roof, thereby providing a charging opening between the roof and the top of the other side wall when said unitary structure is tilted to lowered position, and means for tilting said unitary structure.

3. An open hearth furnace comprising a stationary roof, a unitary structure including a hearth and side walls integral with the hearth, said side walls extending up to the roof when said unitary structure is in raised position, said roof extending beyond the ends of said unitary structure, a cradle supporting said unitary structure, arcuate rockers on said cradle and spaced longitudinally of said unitary structure, an arcuate rocker seat for each of said rockers, each of said rocker seats being located below and in line with the line of junction between a side wall of said unitary structure and the roof at a distance substantially equal to the radius of said rocker seats, said unitary structure being tiltable relative to the roof about a horizontal axis extending longitudinally of the furnace and located at approximately the line of junction between a side wall of said unitary structure and the roof, thereby providing a charging opening between the roof and the top of the other side wall when said unitary structure is tilted to lowered position, and means for tilting said unitary structure.

4. An open hearth furnace comprising a stationary roof, a unitary structure including a hearth and side walls integral with the hearth, said side walls extending up to the roof when said unitary structure is in raised position, said roof extending beyond the ends of said unitary structure, a bulkhead at each end of said roof and said unitary structure, the bulkheads being integral with the roof, a seal between each end of said unitary structure and one of said bulkheads, a cradle supporting said unitary structure, arcuate rockers on said cradle and spaced longitudinally of said unitary structure, an arcuate rocker seat for each of said rockers, each of said rocker seats being located below and in line with the line of junction between a side wall of said unitary structure and the roof at a distance substantially equal to the radius of said rocker seats, said unitary structure being tiltable relative to the roof about a horizontal axis extending longitudinally of the furnace and located at approximately the line of junction between a side wall of said unitary structure and the roof, thereby providing a charging opening between the roof and the top of the other side wall when said unitary structure is tilted to lowered position, and means for tilting said unitary structure.

5. An open hearth furnace comprising a stationary roof, a unitary structure including a hearth and side walls integral with the hearth, said side walls extending up to the roof when said unitary structure is in raised position, one of said side walls provided with doors for working the charge from a floor during melting and refining stages of the heat, said roof extending beyond the ends of said unitary structure, said unitary structure being tiltable relative to the roof about a horizontal axis extending longitudinally of the furnace and located at approximately the line of junction between the roof and the side wall of said unitary structure which is opposite said doors, thereby providing a charging opening between the roof and the top of the side wall which is provided with said doors when said unitary structure is tilted to lowered position, and means for tilting said unitary structure to lowered position in which said charging opening lies in substantially the same horizontal plane as said doors occupy when said unitary structure is in raised position, thereby enabling charging through said charging opening and working of the heat through said doors from the same floor.

6. An open hearth furnace comprising a stationary roof, a unitary structure including a hearth and side walls integral with the hearth, said side walls extending up to the roof when said unitary structure is in raised position, said roof extending beyond the ends of said unitary structure, water cooled non-refractory columns and beams supporting said roof independently of said unitary structure, said unitary structure being tiltable relative to the roof about a horizontal axis extending longitudinally of the furnace and located at approximately the line of junction between a side wall of said unitary structure and the roof, thereby providing a charging opening between the roof and the top of the other side wall when said unitary structure is tilted to lowered position, and means for tilting said unitary structure.

7. An open hearth furnace comprising a stationary roof, a unitary structure including a hearth and side walls integral with the hearth, said side walls extending up to the roof when said unitary structure is in raised position, said roof extending beyond the ends of said unitary structure, water cooled non-refractory columns and beams supporting said roof independently of said unitary structure, said unitary structure being tiltable relative to the roof about a horizontal axis extending longitudinally of the furnace and located at approximately the line of junction between a side wall of said unitary structure and the roof, thereby providing a charging opening between the roof and the top of the other side wall when said unitary structure is tilted to lowered position, and means controlled by the position of said unitary structure for supplying a relatively large amount of cooling medium to said non-refractory roof beams and columns when said unitary structure is lowered for charging and a relatively small amount of cooling medium when said unitary structure is raised during the working period, and means for tilting said unitary structure.

FRANK W. BROOKE.

REFERENCES CITED

The following references are of record in the file of this patent:

UNITED STATES PATENTS

| Number | Name | Date |
|---|---|---|
| 287,864 | Ryder | Nov. 6, 1883 |
| 769,712 | Potter | Sept. 13, 1904 |
| 1,105,001 | Riveroll | July 28, 1914 |
| 2,435,318 | McFeaters | Feb. 3, 1948 |